United States Patent
Abe et al.

(10) Patent No.: US 8,265,897 B2
(45) Date of Patent: Sep. 11, 2012

(54) ROTATION ANGLE DETECTOR AND PROCESS FOR DETECTING ROTATION ANGLE

(75) Inventors: Fumihiko Abe, Tokyo (JP); Kengo Tanaka, Tokyo (JP); Dongzhi Jin, Tokyo (JP)

(73) Assignee: Furukawa Electric Co., Ltd, Tokyo (JP)

( * ) Notice: Subject to any disclaimer, the term of this patent is extended or adjusted under 35 U.S.C. 154(b) by 438 days.

(21) Appl. No.: 12/447,189

(22) PCT Filed: Sep. 28, 2007

(86) PCT No.: PCT/JP2007/068947
§ 371 (c)(1),
(2), (4) Date: Mar. 26, 2010

(87) PCT Pub. No.: WO2008/050578
PCT Pub. Date: May 2, 2008

(65) Prior Publication Data
US 2010/0185412 A1    Jul. 22, 2010

(30) Foreign Application Priority Data
Oct. 27, 2006   (JP) ................. 2006-292252

(51) Int. Cl.
   *G06F 15/00*   (2006.01)
   *G06F 7/00*    (2006.01)
   *G01B 7/30*    (2006.01)
(52) U.S. Cl. ................ 702/151; 324/207.25; 701/41
(58) Field of Classification Search ............ 702/151; 33/1 N; 324/201.25, 207.25; 477/123; 701/41; 180/466
See application file for complete search history.

(56) References Cited

U.S. PATENT DOCUMENTS

| | | | |
|---|---|---|---|
| 5,930,905 A | 8/1999 | Zabler et al. | |
| 6,507,188 B1 | 1/2003 | Dilger et al. | |
| 6,738,725 B2 * | 5/2004 | Koga et al. | 702/151 |
| 2001/0013774 A1 | 8/2001 | Noltemeyer et al. | |

(Continued)

FOREIGN PATENT DOCUMENTS

EP   1342646 A2   9/2003

(Continued)

OTHER PUBLICATIONS

International Search Report dated Dec. 18, 2007 for PCT Application Serial No. PCT/JP2007/068947, 2 Pages.

(Continued)

*Primary Examiner* — Bryan Bui
(74) *Attorney, Agent, or Firm* — Turocy & Watson, LLP

(57) ABSTRACT

A rotation angle detection device for detecting the absolute rotation angle of a rotation body rotating multiple times and whose rotation is to be detected. The rotation angles of a first rotation body rotating at a rotation angle frequency in correspondence with rotation of the rotation object whose rotation is to be detected and the rotation angle of a second rotation body rotating at a rotation frequency that is different from the rotation angle frequency of the first rotation body are individually detected. Based on a phase difference between continuous angle signals detected, the rotation speed of a main rotation body, which is either the first or the second rotation body, and the absolute rotation angle of the rotation body rotating multiple times and whose rotation is to be detected is calculated based on the detected continuous angle signal and rotation speed of the main rotation body.

10 Claims, 6 Drawing Sheets

U.S. PATENT DOCUMENTS

| | | |
|---|---|---|
| 2004/0059486 A1 | 3/2004 | Takuma et al. |
| 2004/0257070 A1 | 12/2004 | Takuma |
| 2008/0051961 A1* | 2/2008 | Ebashi et al. .................. 701/41 |
| 2010/0060272 A1* | 3/2010 | Tanaka et al. ............ 324/207.25 |

FOREIGN PATENT DOCUMENTS

| | | |
|---|---|---|
| EP | 1477389 A2 | 11/2004 |
| JP | 11-500828 A | 1/1999 |
| JP | 2001-505667 A | 4/2001 |
| JP | 2002098522 | 4/2002 |
| JP | 2002-531858 A | 9/2002 |
| JP | 2004-340677 A | 12/2004 |
| JP | 2005-31055 A | 2/2005 |
| JP | 2006-105827 A | 4/2006 |
| JP | 2006-119082 A | 5/2006 |

OTHER PUBLICATIONS

European Search Report mailed Mar. 27, 2012 for European Patent Application Serial No. 07828689.5, 5 pages.

* cited by examiner

FIG. 2
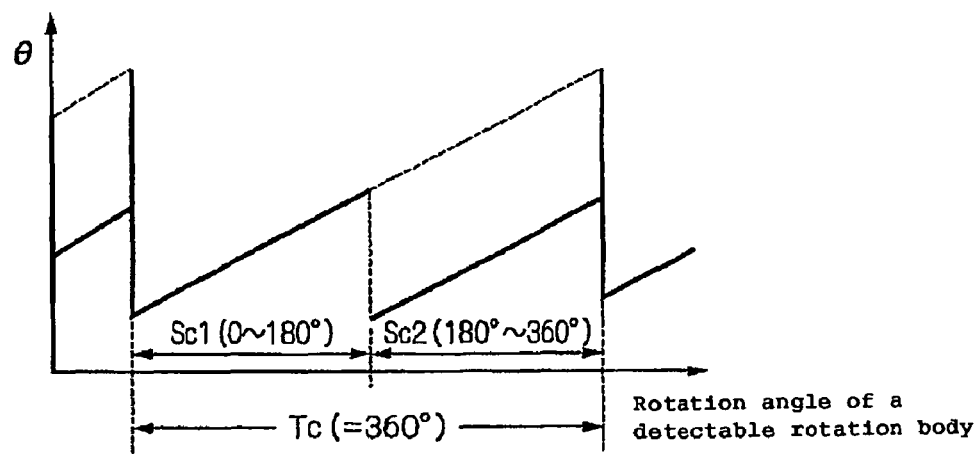
FIG. 2A
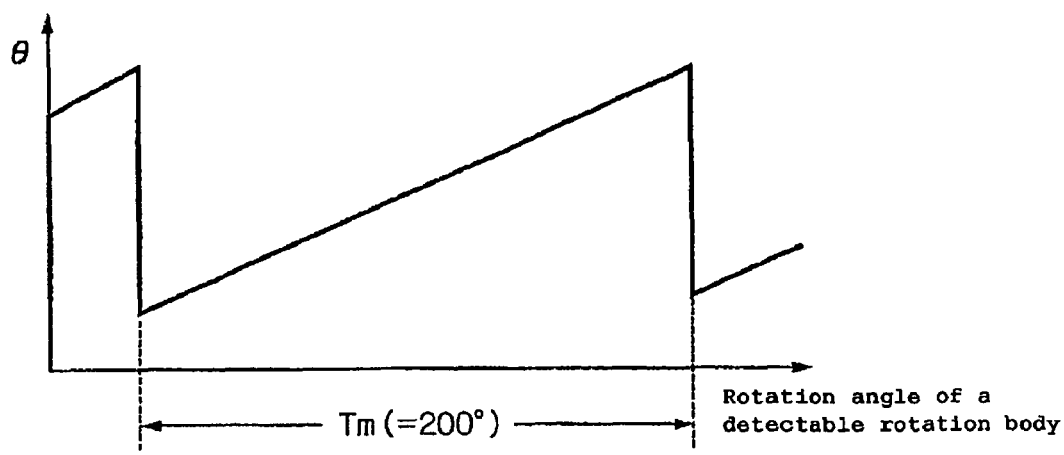
FIG. 2B

FIG. 5

| K | α | β | Sc=Tc/i (degree) | Tm (degree) | FINITE DIFFERENCE OF CYCLE (degree) | RANGE FOR MEASURING ANGLE (degree) |
|---|---|---|---|---|---|---|
| 1.8 | 9 | 5 | 180 | 200 | 20 | 1800 |
| 1.818 | 20 | 11 | 180 | 198 | 18 | 1980 |
| 1.846 | 24 | 13 | 180 | 195 | 15 | 2340 |
| 1.875 | 15 | 8 | 180 | 192 | 12 | 2880 |
| 1.895 | 36 | 19 | 180 | 190 | 10 | 3420 |
| 1.905 | 40 | 21 | 180 | 189 | 9 | 3780 |
| 1.957 | 45 | 23 | 180 | 184 | 4 | 8280 |
| 2.045 | 45 | 22 | 180 | 176 | 4 | 7920 |
| 2.105 | 40 | 19 | 180 | 171 | 9 | 3420 |
| 2.118 | 36 | 17 | 180 | 170 | 10 | 3060 |
| 2.142 | 15 | 7 | 180 | 168 | 12 | 2520 |
| 2.182 | 24 | 11 | 180 | 165 | 15 | 1980 |
| 2.222 | 20 | 9 | 180 | 162 | 18 | 1620 |
| 2.25 | 9 | 4 | 180 | 160 | 20 | 1440 |

FIG. 6

| K | α | β | Sc=Tc/i (degree) | Tm (degree) | FINITE DIFFERENCE OF CYCLE (degree) | RANGE FOR MEASURING ANGLE (degree) |
|---|---|---|---|---|---|---|
| 1.0909 | 12 | 11 | 360 | 330 | 30 | 3960 |
| 1.125 | 9 | 8 | 360 | 320 | 40 | 2880 |
| 1.667 | 5 | 3 | 180 | 216 | 36 | 1080 |
| 2.5 | 5 | 2 | 180 | 144 | 36 | 720 |

ROTATION ANGLE DETECTOR AND PROCESS FOR DETECTING ROTATION ANGLE

CROSS-REFERENCE TO RELATED APPLICATIONS

This application is a US national stage filing of patent cooperation treaty (PCT) Appln. No. PCT/JP2007/068947 (WO2008/050578), filed Sep. 28, 2007, which claims priority to Japanese patent application No. 2006-292252, filed on Oct. 27, 2006, the entire content of which are incorporated herein by reference.

TECHNICAL FIELD

The present invention relates to a rotation angle detector and a process for detecting the rotation angle, for detecting an absolute rotation angle of a detectable rotation body. More specifically, it relates to the rotation angle detector and the process for detecting the rotation angle, by which it becomes possible to design a space for installing such the equipment to be smaller, to widen a measuring range of the absolute rotation angle for the detectable rotation body, and to reduce a cost for production, without decreasing a detection accuracy and a resolution therefor.

BACKGROUND ART

So far, a rotation angle detector (referred to as a rotation sensor hereinafter) is used in a variety of field, such as an engine for vehicle, a steering wheel, a DC motor, or the like. For example, the rotation sensor is used in a case of attaching the same to a shaft to be rotated, such as a steering shaft or the like in a vehicle, and then of detecting a rotation angle of a steering wheel to be integrated with such the shaft.

However, in a case of rotating a rotation body, such as the steering wheel or the like, regarding an absolute rotation angle as a θ, a state of the rotation body is similar from a visual point of view for between zero degree<θ≦360 degrees and 360 degrees<θ≦720 degrees, and then it is difficult to distinguish therebetween. Therefore, there is proposed a rotation sensor for detecting the absolute rotation angle as the θ in the case of rotating the rotation body.

According to a patent document 1, there is proposed a rotation sensor, which comprises: a first detectable body to be rotated due to a rotation body to be measured; a first rotation detecting unit for detecting a signal of the first detectable body; a second detectable body to be rotated due to a rotation body or to the first detectable body; a second rotation detecting unit for detecting a signal of the second detectable body; and an absolute angle detecting unit for detecting an absolute rotation angle of the rotation body, with reference to a gradient of a signal regarding a signal to be output from the second rotation detecting unit and to the values of a voltage (three values of zero, a positive value and a negative value).

[Patent Document 1] Japanese Patent Application Publication No. 2002-098522

DISCLOSURE OF THE INVENTION

Problems to be Solved by the Invention

However, according to the patent document 1, there is a problem that the gradient of the signal regarding the signal to be output from the second rotation detecting unit becomes to be uncertain immediately after turning on an electric source therefor. Moreover, regarding the first rotation detecting unit, for improving a resolution therefor with using a signal by using an optical encoder method, there is a problem that it becomes necessary to enlarge a sensing part of the first detectable body in a radial direction thereof. Hence, there becomes occurred a problem that it cannot help but be enlarged in size for such the rotation sensor.

Here, the present invention is presented for solving the above mentioned points at issue, and an object is to provide a rotation angle detector and a process for detecting the rotation angle, by which it becomes possible to design a space for installing such the equipment to be smaller, to widen a measuring range of the absolute rotation angle for the detectable rotation body, and to reduce a cost for production, without decreasing a detection accuracy and a resolution therefor, by making use of either one of sensors as two for detecting the rotation angle to perform a judgment of a number of the rotations regarding the other sensor.

Means for Solving the Problem

The following invention will be provided for solving the above described conventional problems.

A rotation angle detector regarding the first aspect according to the present invention is characterized in that the rotation angle detector is for detecting an absolute rotation angle of a detectable rotation body to be rotated a multiple number thereof, comprises: a first rotation body to be rotated as a cycle of a rotation angle Tc with corresponding to a rotation of the detectable rotation body; a first detecting unit for detecting the rotation angle of the first rotation body; a second rotation body to be rotated due to the first rotation body or the detectable rotation body, and to be rotated as a cycle of a rotation angle Tm with corresponding to the rotation of the detectable rotation body, that is different from the cycle of the rotation angle Tc regarding the first rotation body; a second detecting unit for detecting the rotation angle of the second rotation body; and a rotation angle detecting unit for detecting the absolute rotation angle of the detectable rotation body with reference to a first continuous signal for the angle to be detected by using the first detecting unit and to a second continuous signal for the angle to be detected by using the second detecting unit, wherein the individual rotation bodies is rotated with corresponding to the rotation of the detectable rotation body, and a rotation angle of the detectable rotation body to be rotated in a period of the individual rotation bodies to be rotated as 360 degrees is defined as the individual cycles of the rotation angle respectively; and in a case where either one of the first rotation body or the second rotation body is assumed to be as a main rotation body, the other one thereof is assumed to be as a substitutive rotation body, the detecting unit for detecting the rotation angle of the main rotation body is defined as a main detecting unit and the detecting unit for detecting the rotation angle of the substitutive rotation body is defined as a substitutive detecting unit regarding the first detecting unit and the second detecting unit, the rotation angle detecting unit detects a number of rotations regarding the main rotation body with reference to a difference of phases ΔT between the first continuous signal for the angle and the second continuous signal for the angle, and calculates the absolute rotation angle of the detectable rotation body to be rotated the multiple number thereof with reference to the individual continuous signals for the angle and the number of rotations to be detected by using the main detecting unit.

According thereto, it becomes possible to design a space for installing such the equipment to be smaller, without decreasing the detection accuracy and the resolution therefor, by setting the cycle of the rotation angle as the Tc and the cycle of the rotation angle as the Tm to become proper values respectively. Moreover, it becomes possible to set a measuring range of the absolute rotation angle for the detectable rotation body to be widened thereby. Further, it becomes able to reduce extremely the detection accuracy and the resolution of the substitutive detecting unit, because the detection accuracy and the resolution of the main detecting unit becomes to be the detection accuracy and the resolution of the rotation angle detector. Thus, it becomes possible to reduce the cost for production thereby. Furthermore, it becomes able to provide a rotation angle detector to be matched with needs of a user, because it becomes able for the user to select either preferred one as the main detecting unit from the first detecting unit and the second detecting unit.

A rotation angle detector regarding the second aspect according to the present invention is characterized in that the rotation angle detecting unit in the rotation angle detector as defined in the first aspect according to the present invention comprises: a signal input unit for inputting the first continuous signal for the angle and the second continuous signal for the angle; an angle calculating unit for calculating the rotation angle of the first rotation body and the rotation angle of the second rotation body with reference to the first continuous signal for the angle and to the second continuous signal for the angle, that are input thereinto by using the signal input unit; a number of rotations judging unit for judging the number of rotations regarding the main rotation body with reference to a finite difference between the rotation angle of the first rotation body and the rotation angle of the second rotation body, that are calculated by using the angle calculating unit; and a large angle calculating unit for calculating the absolute rotation angle of the detectable rotation body, with reference to the number of rotations regarding the main rotation body to be judged by using the number of rotations judging unit and to the first continuous signal for the angle or the second continuous signal for the angle to be detected by using the main detecting unit.

According thereto, it becomes able to reduce extremely the detection accuracy and the resolution of the substitutive detecting unit, because the detection accuracy and the resolution of the main detecting unit becomes to be the detection accuracy and the resolution of the rotation angle detector. Thus, it becomes possible to reduce the cost for production thereby.

A rotation angle detector regarding the third aspect according to the present invention is characterized in that regarding the rotation angle detector as defined in the first or in the second aspect according to the present invention, a cycle of an angle section for judgment is defined as Sc, an absolute value of a finite difference between the cycle of the angle section for judgment Sc and the cycle of the rotation angle Tm is defined as cyclic difference $\Delta S$, and a value of relations K between the cycle of the rotation angle Tc and the cycle of the rotation angle Tm is assumed to be as K=Tc/Tm, and then the value of relations K is satisfied with which is not an integer, further, the cycle of the rotation angle Tc, the cycle of the angle section for judgment Sc and the cyclic difference $\Delta S$ satisfy the following expression of relations as:

$$Sc=Tc/i=\Delta S \cdot j,$$

(the i and the j are positive integers respectively, and the symbol "·" means a multiplication operator).

According thereto, it becomes possible to design a space for installing such the equipment to be smaller, without decreasing the detection accuracy and the resolution therefor, by setting the value of the relations as the K, the cycle of the rotation angle as the Tc, the cycle of the rotation angle as the Tm, and the cycle of the angle section for judgment as the Sc to become proper values respectively. Moreover, it becomes possible to measure in a range as wider without setting any limit for the measuring range of the absolute rotation angle for the detectable rotation body.

A rotation angle detector regarding the fourth aspect according to the present invention is characterized in that regarding the rotation angle detector as defined in the third aspect according to the present invention, the value of relations K is not smaller than 1.8 but not larger than 2.25 in a case where the i=2.

According thereto, it becomes able to produce an optimal rotation angle detector, for having the detection accuracy and the resolution as higher for the absolute rotation angle of the detectable rotation body, for having the measuring range of the absolute rotation angle therefor as wider, and for designing a space for installing such the equipment to be smaller thereby.

Moreover, as enlarging the K, a size of the second rotation body becomes to be smaller. Hence, it becomes able to design a space to be smaller, which is required for installing the rotation angle detector. Further, it becomes possible to design the resolution and the accuracy therefor to be as the K times as higher than conventional, by defining the second detecting unit to be as the main detecting unit and the first detecting unit to be as the substitutive detecting unit. Still further, an allowable error becomes to be as two times as larger than conventional regarding the judgment of the number of rotations, according to the designing of the range to be divided into two pieces regarding the cycle of the angle section for judgment as the Sc and the cycle of the rotation angle as the Tc respectively. And then it becomes possible to perform a further accurate judgment therefor.

Still further, it becomes possible to measure a range of an angle with satisfying sufficiently the range of the angle (approximately 3120 degrees at the maximum) to be required for judging a rotation angle of a steering wheel of a vehicle thereby for example. Furthermore, it becomes possible to satisfy sufficiently the phase difference therebetween (approximately 10 degrees) to be possible for judging the number of rotations thereby.

A rotation angle detector regarding the fifth aspect according to the present invention is characterized in that regarding the rotation angle detector as defined in the third aspect according to the present invention, the value of relations K is not smaller than 2.8 but not larger than 3.2 in a case where the i=3.

According thereto, it becomes able to produce a rotation angle detector, for designing a space for installing such the equipment to be smaller thereby. Moreover, as enlarging the K, the size of the second rotation body becomes to be smaller. Hence, it becomes able to design the space to be smaller, which is required for installing the rotation angle detector. Further, it becomes possible to design the resolution and the accuracy therefor to be as the K times as higher than conventional, by defining the second detecting unit to be as the main detecting unit and the first detecting unit to be as the substitutive detecting unit. Still further, the allowable error becomes to be as three times as larger than conventional regarding the judgment of the number of rotations, according to the designing of the range to be divided into three pieces regarding the cycle of the angle section for judgment as the Sc and the cycle of the rotation angle as the Tc respectively. And then it becomes possible to perform a further accurate judgment therefor.

A process for detecting a rotation angle regarding the first aspect according to the present invention is characterized in that the process for detecting the rotation angle is, with comprising a first rotation body to be rotated with corresponding to a rotation of a detectable rotation body to be rotated a multiple number thereof and a second rotation body to be rotated due to the first rotation body or the detectable rotation body, and for detecting an absolute rotation angle of the detectable rotation body, comprises the steps of: (a) detecting a rotation angle of the first rotation body to be rotated as a cycle of the rotation angle Tc, as a first detection step; (b) detecting a rotation angle of the second rotation body to be rotated as a cycle of the rotation angle Tin with corresponding to the rotation of the detectable rotation body, that is different from the cycle of the rotation angle Tc regarding the first rotation body, as a second detection step; and (c) detecting the absolute rotation angle of the detectable rotation body with reference to a first continuous signal for the angle to be detected at the first detection step (a) and to a second continuous signal for the angle to be detected at the second detection step (b), as a rotation angle detection step, wherein the individual rotation bodies is rotated with corresponding to the rotation of the detectable rotation body, and a rotation angle of the detectable rotation body to be rotated in a period of the individual rotation bodies to be rotated as 360 degrees is defined as the individual cycles of the rotation angle respectively; and in a case where either one of the first rotation body or the second rotation body is assumed to be as a main rotation body, the other one thereof is assumed to be as a substitutive rotation body, the step for detecting the rotation angle of the main rotation body is defined as a main detection step and the step for detecting the rotation angle of the substitutive rotation body is defined as a substitutive detection step, at the rotation angle detection step (c) a number of rotations regarding the main rotation body is detected with reference to a difference of phases ΔT between the first continuous signal for the angle and the second continuous signal for the angle, and the absolute rotation angle of the detectable rotation body to be rotated the multiple number thereof is calculated with reference to the individual continuous signals for the angle and the number of rotations to be detected at the main detection step.

According thereto, it becomes able to obtain the advantages as equivalent to that are obtained according to the above mentioned rotation angle detector regarding the first aspect according to the present invention.

A process for detecting a rotation angle regarding the second aspect according to the present invention is characterized in that regarding the process for detecting the rotation angle at the rotation angle detector as defined in the first aspect according to the present invention, the rotation angle detection step (C) comprises the steps of: (d) inputting the first continuous signal for the angle and the second continuous signal for the angle, as a signal input step; (e) calculating the rotation angle of the first rotation body and the rotation angle of the second rotation body as an angle calculation step, with reference to the first continuous signal for the angle and to the second continuous signal for the angle, that are input thereinto at the signal input step (d); (f) judging the number of rotations regarding the main rotation body as a number of rotations judging step, with reference to a finite difference between the rotation angle of the first rotation body and the rotation angle of the second rotation body, that are calculated at the angle calculation step (e); and (g) calculating the absolute rotation angle of the detectable rotation body as a large angle calculation step, with reference to the number of rotations regarding the main rotation body to be judged at the number of rotations judging step (f) and to the first continuous signal for the angle or the second continuous signal for the angle to be detected at the main detection step.

According thereto, it becomes able to obtain the advantages as equivalent to that are obtained according to the above mentioned rotation angle detector regarding the second aspect according to the present invention.

A process for detecting a rotation angle regarding the third aspect according to the present invention is characterized in that regarding the process for detecting the rotation angle as defined in the first or the second aspect according to the present invention, a cycle of an angle section for judgment is defined as Sc, an absolute value of a finite difference between the cycle of the angle section for judgment Sc and the cycle of the rotation angle Tm is defined as cyclic difference ΔS, and a value of relations K between the cycle of the rotation angle Tc and the cycle of the rotation angle Tm is assumed to be as K=Tc/Tm, and then the value of relations K is satisfied with which is not an integer, further, the cycle of the rotation angle Tc, the cycle of angle judgment Sc and the cyclic difference ΔS satisfy the following expression of relations as $$Sc = Tc/i = \Delta S \cdot j,$$

(the i and the j are positive integers respectively, and the symbol "·" means a multiplication operator).

According thereto, it becomes able to obtain the advantages as equivalent to that are obtained according to the above mentioned rotation angle detector regarding the third aspect according to the present invention.

A process for detecting a rotation angle regarding the fourth aspect according to the present invention is characterized in that regarding the process for detecting the rotation angle as defined in the third aspect according to the present invention, the value of relations K is not smaller than 1.8 but not larger than 2.25 in a case where the i=2.

According thereto, it becomes able to obtain the advantages as equivalent to that are obtained according to the above mentioned rotation angle detector regarding the fourth aspect according to the present invention.

A process for detecting a rotation angle regarding the fifth aspect according to the present invention is characterized in that regarding the process for detecting the rotation angle as defined in the third aspect according to the present invention, the value of relations K is not smaller than 2.8 but not larger than 3.2 in a case where the i=3.

According thereto, it becomes able to obtain the advantages as equivalent to that are obtained according to the above mentioned rotation angle detector regarding the fifth aspect according to the present invention.

Effects of the Invention

According to the present invention, it becomes possible to design a space for installing such the equipment to be smaller, without decreasing the detection accuracy and the resolution of the rotation angle detector. Moreover, it becomes possible to set a measuring range of the absolute rotation angle for the detectable rotation body to be widened thereby. Further, it becomes able to reduce extremely the detection accuracy and the resolution of the substitutive detecting unit, because the detection accuracy and the resolution of the main detecting unit becomes to be the detection accuracy and the resolution of the rotation angle detector. Thus, it becomes possible to reduce the cost for production thereby. Furthermore, it becomes able to provide a rotation angle detector to be matched with needs of a user, because it becomes able for the user to select either preferred one as the main detecting unit from the first detecting unit and the second detecting unit.

BRIEF DESCRIPTION OF THE DRAWINGS

FIG. 2 is a graph showing waveforms of a first continuous signal for an angle and a second continuous signal for an angle, wherein FIG. 2(a) shows a waveform of the first continuous signal for the angle, and FIG. 2(b) shows a waveform of the second continuous signal for the angle.

FIG. 5 is a diagram for explaining a range for measuring an angle with using a rotation sensor 10 regarding the range thereof between 1.8≦K≦2.25.

FIG. 6 is a diagram for explaining a range for measuring an angle with using the rotation sensor 10 regarding the range thereof as 1.8>K, or K>2.25.

DESCRIPTION OF THE REFERENCE SYMBOLS

10 ROTATION SENSOR
11 FIRST ROTOR
13 FIRST ANGLE SENSOR
21 SECOND ROTOR
23 SECOND ANGLE SENSOR
30 ROTATION ANGLE DETECTING PART

BEST MODE FOR CARRYING OUT THE INVENTION

An embodiment according to the present invention will be described below, with reference to the drawings. Here, the embodiment to be described below is given by way of illustration only, and does not limit the scope of the present invention. Therefore, those skilled in the art can employ any embodiments in which the individual elements or all the elements are replaced with equivalent ones, however, that are also encompassed in the scope of the present invention.

One embodiment regarding a rotation angle detector according to the present invention is the rotation angle detector for detecting an absolute rotation angle of a detectable rotation body to be rotated a multiple number thereof.

Such the rotation angle detector comprises: a first rotation body to be rotated as a cycle of a rotation angle Tc with corresponding to a rotation of the detectable rotation body; a first detecting unit for detecting the rotation angle of the first rotation body; a second rotation body to be rotated due to the first rotation body or the detectable rotation body, and to be rotated as a cycle of a rotation angle Tm with corresponding to the rotation of the detectable rotation body, that is different from the cycle of the rotation angle Tc regarding the first rotation body; a second detecting unit for detecting the rotation angle of the second rotation body; and a rotation angle detecting unit for detecting the absolute rotation angle of the detectable rotation body with reference to a first continuous signal for the angle to be detected by using the first detecting unit and to a second continuous signal for the angle to be detected by using the second detecting unit.

Moreover, in a case where either one of the first rotation body or the second rotation body is assumed to be as a main rotation body, the other one thereof is assumed to be as a substitutive rotation body, the detecting unit for detecting the rotation angle of the main rotation body is defined as a main detecting unit and the detecting unit for detecting the rotation angle of the substitutive rotation body is defined as a substitutive detecting unit regarding the first detecting unit and the second detecting unit, at the rotation angle detecting unit a number of rotations regarding the main rotation body is detected thereby with reference to a difference of phases ΔT between the first continuous signal for the angle and the second continuous signal for the angle, and the absolute rotation angle of the detectable rotation body to be rotated the multiple number thereof is calculated thereat with reference to the individual continuous signals for the angle and the number of the rotations to be detected by using the main detecting unit.

Figure 1:
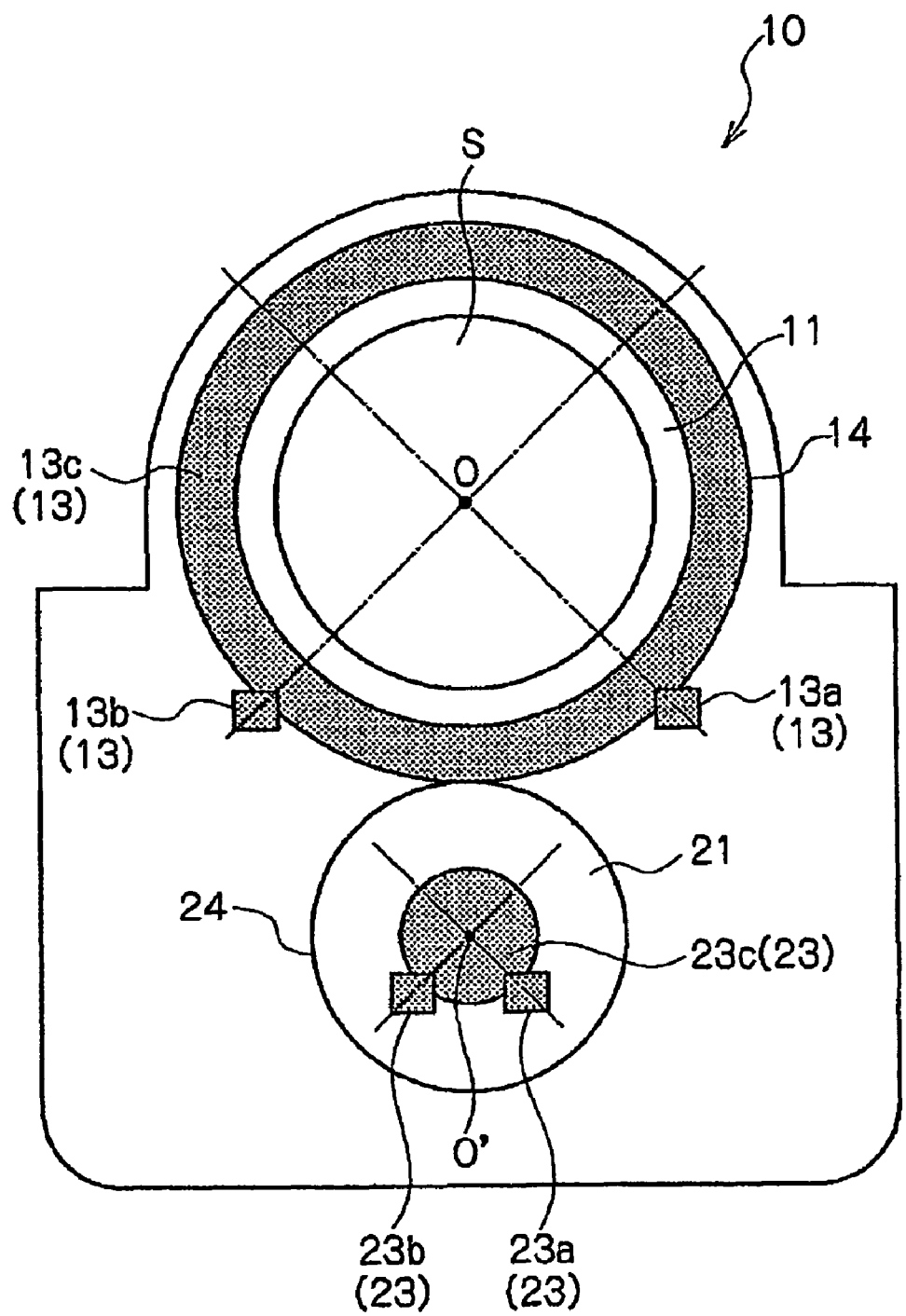
FIG. 1 is a diagram showing one example of an appearance configuration regarding a rotation angle detector that the present invention is applicable thereto.

FIG. 1 is a diagram showing one example of an appearance configuration regarding one embodiment of a rotation angle detector that the present invention is applicable thereto. Hereinafter, such the rotation angle detector is referred to as a rotation sensor.

As shown in FIG. 1, a rotation sensor 10 is attached at a steering shaft S (referred to as a shaft S hereinafter) as being inlaid thereinto. Moreover, the rotation sensor 10 comprises a first rotor 11 (that is to say, the first rotation body), a second rotor 21 (that is to say, the second rotation body), a first angle sensor 13 (that is to say, the first detecting unit), a second angle sensor 23 (that is to say, the second detecting unit), and a rotation angle detecting part 30 (not shown in the figure; that is to say, a rotation angle detecting unit).

Further, the first rotor 11 is fixed at the shaft S as contacting to a periphery of the shaft S, comprises a first gear 14 at a peripheral part thereof, and is designed to have a structure for rotating with corresponding to a rotation of the shaft S. Still further, the second rotor 21 comprises a second gear 24 to engage with the first gear 14 at a peripheral part thereof and is designed to have a structure for rotating with corresponding to a rotation of the first rotor 11. That is to say, the same is designed to have a structure for rotating with corresponding to the rotation of the shaft S. Here, a rotation body is designed to be rotated with corresponding to the rotation of the shaft S, and a rotation angle for the shaft S to rotate is assumed to be as a cycle of the rotation angle for the rotation body in a period of rotating the rotation body as 360 degrees, a cycle of the rotation angle for the first rotor 11 is defined as a Tc, a cycle of the rotation angle for the second rotor 21 is defined as a Tm. Still further, the cycle of the rotation angle as the Tm is set for satisfying that Tm<Tc. Still further, a value as not an integer is defined as a value of a K, that satisfies an expression of relations as that K=Tc/Tm. And then the Tm=200 degrees, in a case of defining the K=1.8 and because the Tc is defined to be as that Tc=360 degrees.

Still further, the first angle sensor 13 comprises first Hall elements as a 13a and a 13b, and a magnet of ring shape as a 13c, and then the rotation angle of the first rotor 11 is detected thereby. Still further, the first Hole element 13a and the 13b are arranged for being able to detect a variation in strength of a magnetism in a vertical direction to a radial direction of the magnet of ring shape 13c. Here, the first Hall element 13a and the 13b are arranged at an outside of a circumference of the magnet of ring shape 13c respectively, for a gradient of a normal line to become as approximately 90 degrees regarding a magnetic sensitive face corresponding to a central axis of the rotation as an O.

Still further, the magnet of ring shape 13c is magnetized in a circumferential direction thereof, and then a distribution of a magnetic flux density thereof is designed to be as approximately sine wave in a circumferential direction thereof. Still further, the same is fixed at the first rotor 11, and then the same is designed to be rotated with such the first rotor 11. Here, the same is fixed for a central axis thereof as vertical to the magnetic sensitive face in the radial direction of the magnet of ring shape 13c to be as the central axis of the rotation as the O regarding the first rotor 11.

Still further, the second angle sensor 23 comprises second Hall elements as a 23a and a 23b, and a magnet of round shape as a 23c, and then the rotation angle of the second rotor 21 is detected thereby. Still further, the second Hole element 23a and the 23b are arranged for being able to detect a variation in strength of a magnetism in a vertical direction to a radial direction of the magnet of round shape 23c. Here, the second Hall element 23a and the 23b are arranged at an outside of a circumference of the magnet of round shape 23c, for a gradient of a normal line to become as approximately 90 degrees regarding a magnetic sensitive face corresponding to a central axis of the rotation as an O'.

Still further, the magnet of round shape 23c is magnetized in a circumferential direction thereof, the same is fixed at the second rotor 21, and then the same is designed to be rotated with the second rotor 21. Here, the same is fixed for a central axis thereof as vertical to the magnetic sensitive face in the radial direction of the magnet of round shape 23c to be as the central axis of the rotation as the O' regarding the second rotor 21.

Still further, a main sensor for determining an accuracy and a resolution of the rotation angle of the shaft S is defined as the first angle sensor 13, and a substitutive sensor for judging a number of the rotations for the first rotor 11 is defined as the second angle sensor 23, of which the rotation angle is detected by using the first angle sensor 13 as the main sensor.

Still further, at the rotation angle detecting part 30 as not shown in FIG. 1, the absolute rotation angle of the shaft S is detected thereby, with reference to the first continuous signal for the angle to be detected by using the first angle sensor 13 and to the second continuous signal for the angle to be detected by using the second angle sensor 23. That is to say, at the rotation angle detecting unit, the number of the rotations for the first rotor is detected thereby, with reference to the difference of the phases ΔT between the first continuous signal for the angle and the second continuous signal for the angle. Furthermore, at the same, the absolute rotation angle of the shaft S to be rotated the multiple number thereof is calculated thereby, with reference to the individual continuous signals for the angle and to the number of the rotations to be detected by using the first angle sensor.

Next, the first continuous signal for the angle to be detected by using the first angle sensor 13 and the second continuous signal for the angle to be detected by using the second angle sensor 23 will be described in detail below, with reference to FIG. 2 and FIG. 3.

FIG. 2 is a graph showing waveforms of the first continuous signal for the angle and of the second continuous signal for the angle, wherein FIG. 2(*a*) shows a waveform of the first continuous signal for the angle, and FIG. 2(*b*) shows a waveform of the second continuous signal for the angle.

Here, a signal of sine curved line and a signal of cosine curved line are output from the first Hall element 13a and the 13b. And then in a case of converting such the signals into individual angle signals respectively, the first continuous signal for the angle becomes to be output therefrom with having a waveform of sawtooth shape as shown in FIG. 2(*a*), that varies in a cycle of the Tc. Here, the horizontal axis therein indicates the rotation angle of the shaft S, and the vertical axis therein indicates the rotation angle of the first rotor 11.

Moreover, the first Hall element 13a and the 13b individually has the normal line with the gradient thereof as approximately 90 degrees regarding the magnetic sensitive face corresponding to the central axis of the rotation as the O. Further, the individual output signals from the Hall elements is proportional to the magnetic flux density to be applied thereto respectively, and then such the individual output signals from the two of the Hall elements becomes to be two of sine wave signals (a sin θ and a cos θ) with having a difference of phases therebetween as 90 degrees respectively, in response to the rotation of the magnet of ring shape. Here, the θ is the rotation angle of the magnet. Therefore, it becomes able to evaluate the angle θ by the following equation.

$$\theta = \arctan(\sin\theta/\cos\theta).$$

That is to say, with using the signals individually detected from the first Hall element 13a and the 13b, it becomes able to detect a position as the θ (between zero degree and 360 degrees) of the rotation angle for the first rotor. In a case of the Tc=360 degrees, as assuming the i=2, it becomes able to judge whether the detected θ is in a first section (Sc 1) of between zero degree and 180 degrees or in a second section (Sc 2) of between 180 degrees and 360 degrees. Here, the i is a numeral for sectioning the cycle of the rotation angle as the Tc into the angle sections for judgment.

As similar thereto, the second continuous signal for the angle becomes to be output therefrom with having a waveform of sawtooth shape as shown in FIG. 2(*b*), that varies in a cycle of the Tm. Here, the horizontal axis therein indicates the rotation angle of the shaft S, and the vertical axis therein indicates the rotation angle of the second rotor 21. Moreover, the Tm=200 degrees.

Figure 3:
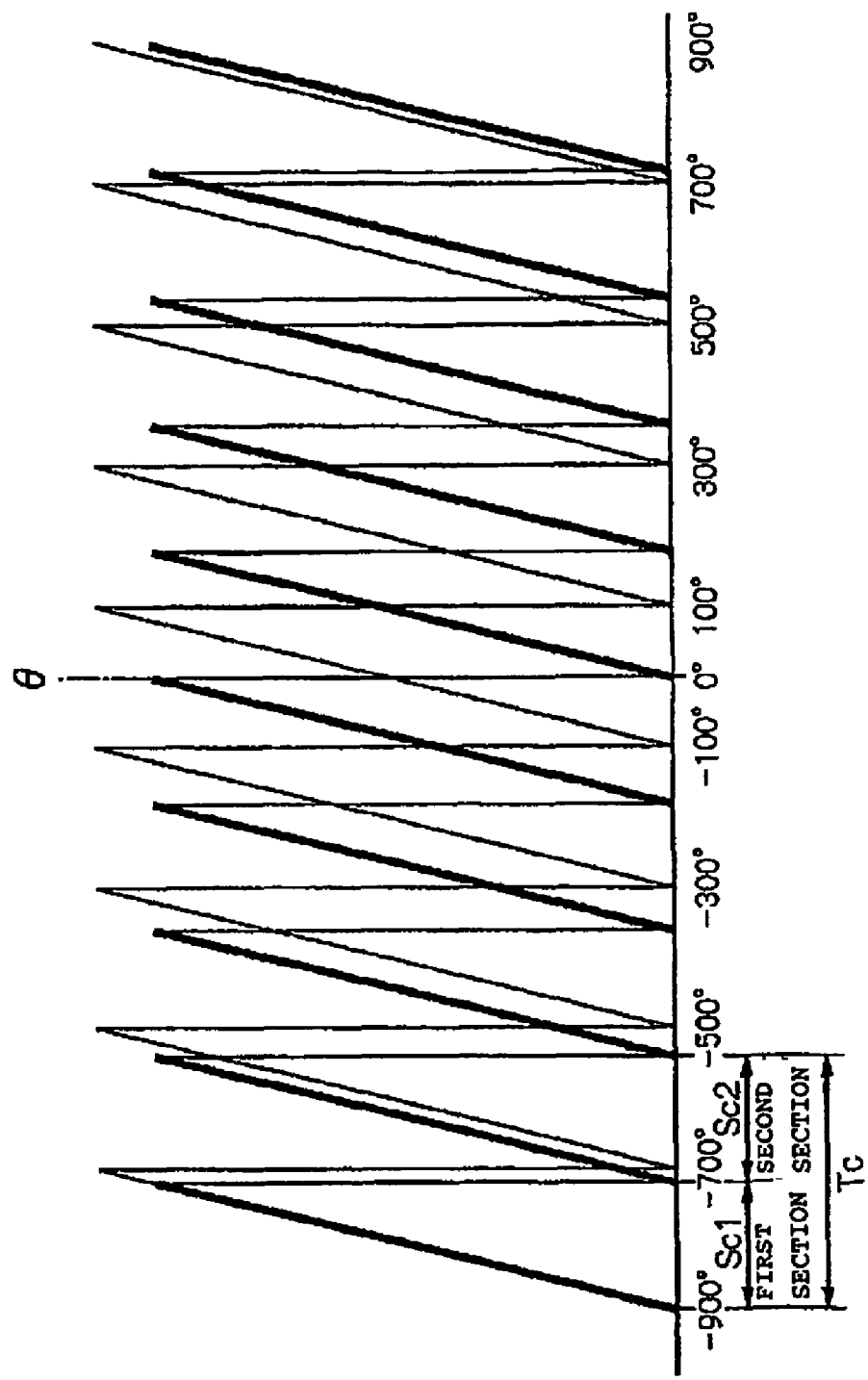
FIG. 3 is a graph showing a variation in difference of phases between the first continuous signal for the angle and the second continuous signal for the angle.

Further, FIG. 3 is a graph showing a variation in the difference of the phases between the first continuous signal for the angle and the second continuous signal for the angle. Such the first continuous signal for the angle and the second continuous signal for the angle as shown in FIG. 2 are output therefrom at the same time. And then as assuming the difference of the phases between the first continuous signal for the angle and the second continuous signal for the angle to be as zero degree, at the rotation angle of the shaft S as −900 degrees, the difference of the phases therebetween becomes to be varied as each of ΔS (referred to as a cyclic difference) with corresponding to each of 180 degrees, as shown in FIG. 3. Here, the cyclic difference ΔS is an absolute value of a finite difference between the cycle of the angle section for judgment as the Sc and the cycle of the rotation angle as the Tm, and the ΔS=|Sc−Tm|=20 degrees.

Next, the above mentioned rotation angle detecting part 30 will be described in further detail below, with reference to FIG. 3 and FIG. 4.

Figure 4:
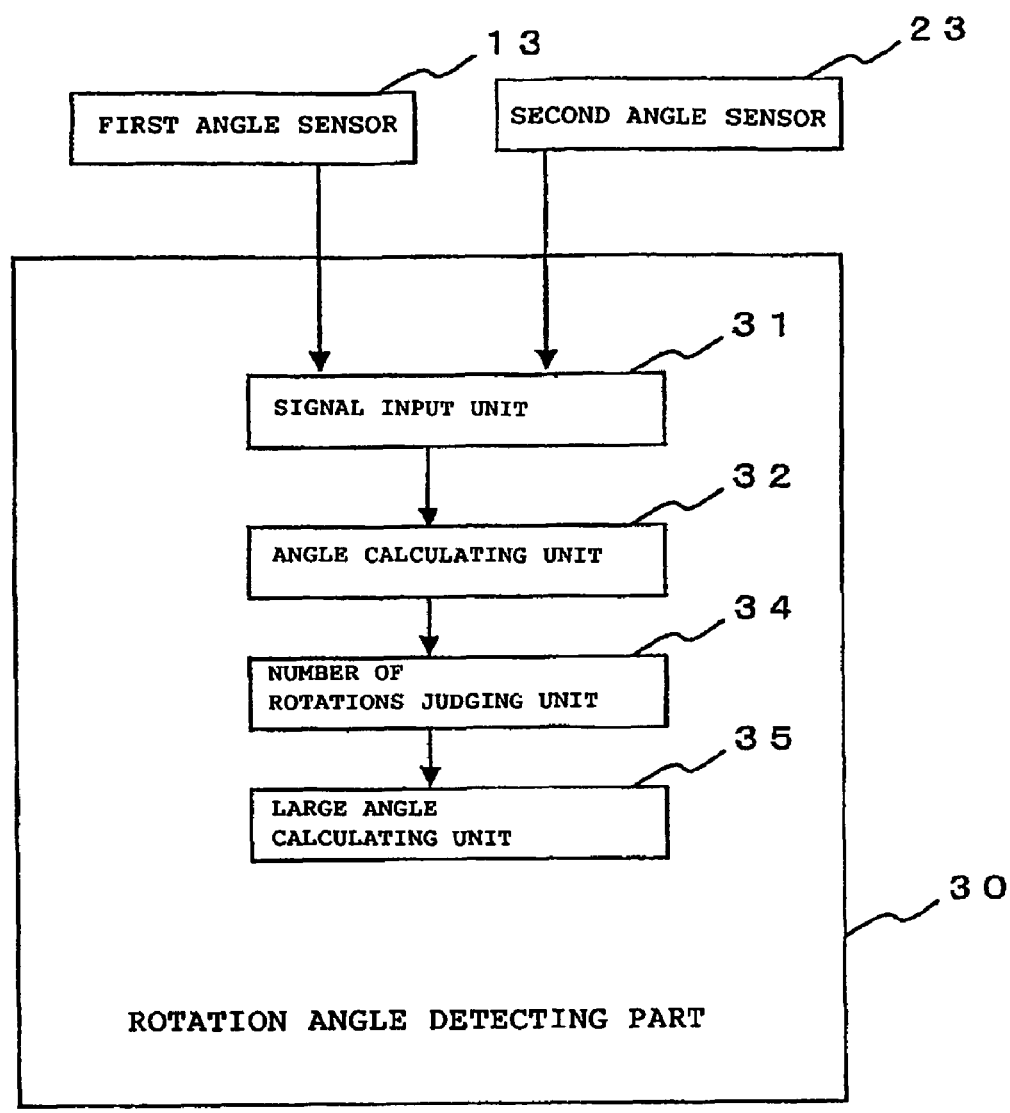
FIG. 4 is a diagram showing one example regarding a functional block diagram for a rotation angle detecting part 30.

FIG. 4 is a diagram showing one example regarding a functional block diagram for the rotation angle detecting part 30. As shown in FIG. 4, the rotation angle detecting part 30 comprises a signal input unit 31, an angle calculating unit 32, a number of rotations judging unit 33, and a large angle calculating unit 34.

Moreover, regarding the signal input unit 31, the detected first continuous signal for the angle is input thereinto from the first angle sensor 13, and the detected second continuous signal for the angle is input thereinto from the second angle sensor 23 as well.

Further, regarding the angle calculating unit 32, the rotation angle of the first rotor 11 is calculated thereat, with reference to the first continuous signal for the angle, which is input by using the signal input unit 31. Still further, the rotation angle of the second rotor 21 is calculated thereat, with reference to the second continuous signal for the angle, which is input by using the signal input unit 31.

Still further, regarding the number of rotations judging unit 33, the number of rotations for the first rotor is judged thereat, with reference to the finite difference between the rotation angle of the first rotor and the rotation angle of the second rotor, that are calculated by using the angle calculating unit. That is to say, at the number of rotations judging unit 33, an existing section is judged whether at the first section Sc 1 or at the second section Sc 2, and then the number of rotations thereof is judged with making use of such the judged existing section. For example, in a case where the existing section is judged as at the first section Sc 1, a difference of the phases $\Delta T$ between the first continuous signal for the angle and the second continuous signal for the angle for each of the Sc 1 is zero degree, 40 degrees, 80 degrees, 120 degrees and 160 degrees respectively. That is to say, it is able to judge accurately without any problems if an allowable error of the angle for the first angle sensor 13 and for the second angle sensor 23 is approximately ±15 degrees as in total (<±20 degrees). For example, in a case where the difference of the phases $\Delta T$ between the first continuous signal for the angle and the second continuous signal for the angle is assumed to be as 35 degrees, it is able to judge the number of rotations therefor as two. That is to say, the allowable error becomes to be widened as double in a case where the existing section is judged and then the number of rotations therefor is judged thereby (as conventional, the individual allowable errors regarding the angles for both of the sensors has to satisfy that <±10 degrees as in total respectively).

Still further, regarding the large angle calculating unit 34, the absolute rotation angle of the shaft S is calculated thereat, with reference to the number of rotations for the first rotor 11 and to (the rotation angle according to) the first continuous signal for the angle, that are judged by using the number of rotations judging unit 33.

Thus, at the rotation sensor 10, it becomes able to detect the absolute rotation angle of the shaft S. Next, the above mentioned value of the K will be described in further detail below, with reference to FIG. 5.

The value of the K is the value to be obtained from the expression of relations between the cycle of the rotation angle as the Tc for the first rotor 11 and the cycle of the rotation angle as the Tm for the second rotor 21 (the K=Tc/Tm). Here, according to the present invention, the value of relations as the K is satisfied with which is not an integer. Moreover, the cycle of the rotation angle as the Tc, the cycle of the angle section for judgment as the Sc and the cyclic difference as the $\Delta S$ satisfy the expression of relations as the Sc=Tc/i=$\Delta S \cdot j$ (the i and the j are positive integers respectively, and the symbol "·" means a multiplication operator).

Thus, a degree of magnitude regarding the value of the K becomes to influence onto the accuracy and the resolution of the rotation sensor 10. Moreover, the same becomes to influence onto a size of the rotor 21, that is to say, a size of the rotation sensor 10. Hence, the value of the K becomes to be as between 1.8≦K≦2.25 in a case where the i (=Tc/Sc)=2, for designing therewith the detection accuracy and the resolution to be as higher regarding the absolute rotation angle of the rotation sensor 10, for designing therewith the measuring range of the absolute rotation angle thereof to be as wider, and for designing therewith the space for the installation thereof to be as smaller.

FIG. 5 is a table for explaining a range for measuring an angle with using the rotation sensor 10 regarding the range thereof as between 1.8≦K≦2.25.

Here, the range for measuring the angle according to the rotation sensor 10 is a least common multiple between the cycle of the rotation angle as the Tc for the first rotor 11 and the cycle of the rotation angle as the Tm for the first rotor 21. Moreover, an α and a β are values that correspond to a number of teeth for the first gear 14 and to a number of teeth for the second gear 24 respectively. That is to say, in a case where the number of teeth for the first gear 14 is defined as the number of teeth of the first gear, and the number of teeth for the second gear 24 is defined as the number of teeth of the second gear respectively, the α and the β are the values that the number of teeth of the first gear and the number of teeth of the second gear are divided by a greatest common measure between the number of teeth of the first gear and the number of teeth of the second gear respectively. Further, the α is the value by which 360 degrees is divisible, because the cycle of the rotation angle as the Tc and the cycle of the rotation angle as the Tm are the integers respectively. Therefore, the values for the α to be stood for become to be the values as the following eighteen pieces.

The values for the α to be stood for: 2, 3, 4, 5, 6, 8, 9, 10, 12, 15, 18, 20, 24, 30, 36, 40, 45 and 60.

As described above, according to the rotation sensor 10, which comprises the first rotor 11, the second rotor 21, the first angle sensor 13 and the second angle sensor 23, that are satisfied with which the α=9, the β=5, the Sc=Tc/2=180 degrees, and the Sm=the Tm=200 degrees, in a case where the K=1.8 for example, as shown in FIG. 5, it becomes able to measure in the range for measuring the angle of 1800 degrees regarding the absolute rotation angle of the shaft S.

As described above, as enlarging the K, the size of the second rotor 21 becomes to be smaller. Hence, it becomes able to design the space to be smaller, which is required for installing the rotation sensor 10. Moreover, according to the above description, the first angle sensor 13 is defined as the main sensor, and the second angle sensor 23 is defined as the substitutive sensor. However, it becomes possible to design the resolution and the accuracy therefor to be as the K times as higher than the former case, by defining the second angle sensor 23 to be as the main sensor and the first angle sensor 13 to be as the substitutive sensor. Further, the allowable error becomes to be as the i times as larger than conventional regarding the judgment of the number of rotations therefor, according to the designing the existing section to be divided into the i pieces (here, there are two pieces). And then it becomes possible to perform a further accurate judgment therefor.

Still further, it becomes possible to measure a range of an angle with satisfying sufficiently the range of the angle (approximately 3120 degrees at the maximum) to be required for judging a rotation angle of a steering wheel of a vehicle thereby for example. Furthermore, it becomes possible to satisfy sufficiently the difference of the phases therebetween (approximately 10 degrees) to be possible for judging the number of rotations thereby.

FIG. 6 is a diagram for explaining a range for measuring an angle with using the rotation sensor 10 regarding the range thereof as 1.8>K, or K>2.25.

For example, in a case where the K=2.5, by using the rotation sensor 10 which comprises the first rotor 11, the second rotor 21, the first angle sensor 13 and the second angle sensor 23, with satisfying the α=5, the β=2, the Sc=Tc/2=180 degrees, the Sm=the Tm=144 degrees, it becomes able to measure in a range for measuring the angle as 720 degrees regarding the absolute rotation angle of the shaft S. Thus, it is effective thereby in a case where the range for measuring the angle regarding the absolute rotation angle of the shaft S is in a range as relatively narrower.

Moreover, in a case where the K=1.0909 for example, by using the rotation sensor 10 which comprises the first rotor 11, the second rotor 21, the first angle sensor 13 and the second angle sensor 23, with satisfying the α=12, the β=11, the Sc=the Tc=360 degrees, the Sm=the Tm=330 degrees, it becomes able to measure in a range for measuring the angle as 3960 degrees regarding the absolute rotation angle of the shaft S. Thus, it is effective thereby, in a case where there is a space sufficiently for the installation thereof, and then where the range for measuring the angle regarding the absolute rotation angle of the shaft S is in a range as wider and there is required the detection accuracy thereof as higher as well.

Furthermore, according to the rotation sensor 10, as described above, the first rotor 11 corresponds to the first rotation body according to the present invention; the second rotor 21 corresponds to the second rotation body according to the present invention; the first angle sensor 13 corresponds to the first detecting unit and to the first detection step according to the present invention; the second angle sensor 23 corresponds to the second detecting unit and to the second detection step according to the present invention; the rotation angle detecting part 30 corresponds to the rotation angle detecting unit and to the rotation angle detection step according to the present invention; the signal input unit 31 corresponds to the signal input unit and to the signal input step according to the present invention; the angle calculating unit 32 corresponds to the angle calculating unit and to the angle calculation step according to the present invention; the number of rotations judging unit 33 corresponds to the number of rotations judging unit and to the number of rotations judging step according to the present invention; and the large angle calculating unit 34 corresponds to the large angle calculating unit and to the large angle calculation step according to the present invention.

Figure 7:
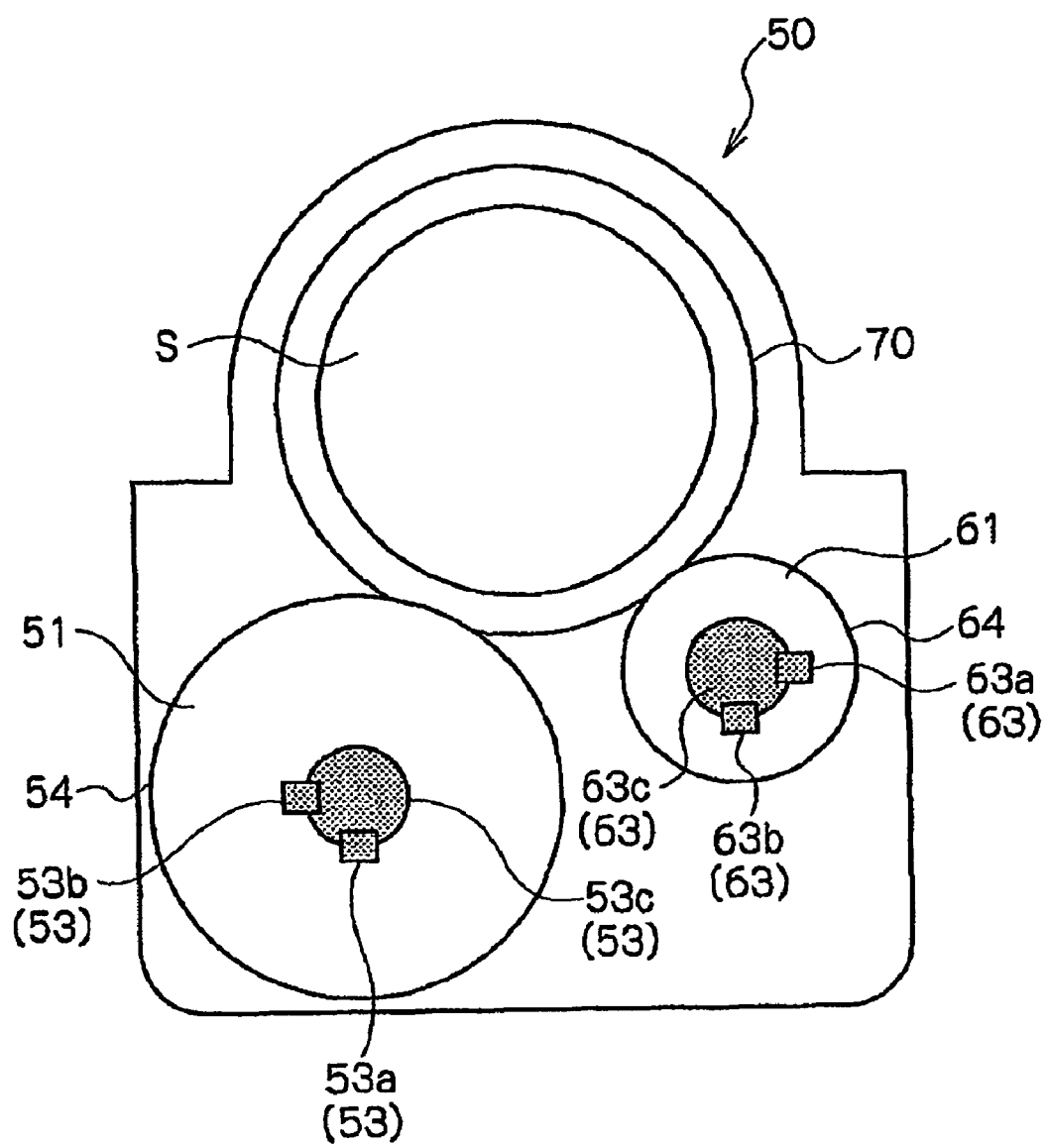
FIG. 7 is a diagram showing one example of an appearance configuration regarding a rotation sensor 50 as another one that the present invention is applicable thereto.

FIG. 7 is a diagram showing one example of an appearance configuration regarding a rotation sensor 50 according to the other embodiment that the present invention is applicable thereto.

As shown in FIG. 7, the rotation sensor 50 is attached at a steering shaft S as being inlaid thereinto. Moreover, the rotation sensor 50 comprises a first rotor 51, a second rotor 61, a first angle sensor 53, a second angle sensor 63, a shaft gear 70, and a rotation angle detecting part 30 (not shown in the figure).

Further, the shaft gear 70 is fixed at the shaft S as contacting to a periphery of the shaft S. Still further, the first rotor 51 comprises a first gear 54 to engage with the shaft gear 70 at a peripheral part thereof; and the same is designed to have a structure for rotating with corresponding to a rotation of the shaft S. Still further, the second rotor 61 comprises a second gear 64 to engage with the shaft gear 70 at a peripheral part thereof, and the same is designed to have a structure for rotating with corresponding to the rotation of the shaft S.

Still further, the first angle sensor 53 comprises first Hall elements as a 53a and a 53b, and a magnet of round shape as a 53c, and then the rotation angle of the first rotor 51 is detected thereby. Still further, the first Hole element 53a and the 53b are arranged for being able to detect a variation in strength of a magnetism in a vertical direction to a radial direction of the magnet of round shape 53c. Here, the first Hall element 53a and the 53b are arranged at an outside of a circumference of the magnet of round shape 53c respectively, for a gradient of a normal line to become as approximately 90 degrees regarding a magnetic sensitive face corresponding to a central axis of the rotation as an O'.

Still further, the magnet of round shape 53c is magnetized in a circumferential direction thereof. Still further, the same is fixed at the first rotor 51, and then the same is designed to be rotated with such the first rotor 51. Here, the same is fixed for a central axis thereof as vertical to the magnetic sensitive face in the radial direction of the magnet of round shape 53c to be as the central axis of the rotation as the O regarding the first rotor 51.

Still further, the second angle sensor 63 comprises second Hall elements us a 63a and a 63b, and a magnet of round shape as a 63c, and then the rotation angle of the second rotor 61 is detected thereby. Still further, the second Hole element 63a and the 63b are arranged for being able to detect a variation in strength of a magnetism in a vertical direction to a radial direction of the magnet of round shape 63c. Here, the second Hall element 63a and the 63b are arranged at an outside of a circumference of the magnet of round shape 63c, for a gradient of a normal line to become as approximately 90 degrees regarding a magnetic sensitive face corresponding to a central axis of the rotation as an O'.

Still further, the magnet of round shape 63c is magnetized in a circumferential direction thereof, the same is fixed at the second rotor 61, and then the same is designed to be rotated with such the second rotor 61! Here, the same is fixed for a central axis thereof as vertical to the magnetic sensitive face in the radial direction of the magnet of round shape 63c to be as the central axis of the rotation as the O' regarding the second rotor 61.

Still further, a main sensor for determining an accuracy and a resolution of the rotation angle of the shaft S is defined as the second angle sensor 63, and a substitutive sensor for judging a number of the rotations for the second rotor 61 is defined as the first angle sensor 53, of which the rotation angle is detected by using the second angle sensor 63 as the main sensor.

Furthermore, at the rotation angle detecting part 30 as not shown in FIG. 7, the absolute rotation angle of the shaft S is detected thereby, with reference to the first continuous signal for the angle to be detected by using the first angle sensor 53 and to the second continuous signal for the angle to be detected by using the second angle sensor 63.

Here, a price for the magnet of ring shape is excessively expensive comparing to the price for the magnet of round shape. Thus, it becomes able to reduce thereby the cost for production thereof.

What is claimed is:

1. A rotation angle detector for detecting an absolute rotation angle of a detectable rotation body to be rotated a multiple number thereof, comprising:
   a first rotation body to be rotated as a cycle of a rotation angle Tc with corresponding to a rotation of the detectable rotation body;
   a first detecting unit for detecting the rotation angle of the first rotation body;
   a second rotation body to be rotated due to the first rotation body or the detectable rotation body, and to be rotated as a cycle of a rotation angle Tm with corresponding to the rotation of the detectable rotation body, that is different from the cycle of the rotation angle Tc regarding the first rotation body;

a second detecting unit for detecting the rotation angle of the second rotation body; and a rotation angle detecting unit for detecting the absolute rotation angle of the detectable rotation body with reference to a first continuous signal for the angle to be detected by using the first detecting unit and to a second continuous signal for the angle to be detected by using the second detecting unit, wherein the individual rotation bodies is rotated with corresponding to the rotation of the detectable rotation body, and a rotation angle of the detectable rotation body to be rotated in a period of the individual rotation bodies to be rotated as 360 degrees is defined as the individual cycles of the rotation angle respectively; and in a case where either one of the first rotation body or the second rotation body is assumed to be as a main rotation body, the other one thereof is assumed to be as a substitutive rotation body, the detecting unit for detecting the rotation angle of the main rotation body is defined as a main detecting unit and the detecting unit for detecting the rotation angle of the substitutive rotation body is defined as a substitutive detecting unit regarding the first detecting unit and the second detecting unit, the rotation angle detecting unit detects a number of rotations regarding the main rotation body with reference to a difference of phases $\Delta T$ between the first continuous signal for the angle and the second continuous signal for the angle, and calculates the absolute rotation angle of the detectable rotation body to be rotated the multiple number thereof with reference to the individual continuous signals for the angle and the number of rotations to be detected by using the main detecting unit.

2. The rotation angle detector as defined in claim 1, wherein the rotation angle detecting unit comprises:

a signal input unit for inputting the first continuous signal for the angle and the second continuous signal for the angle;

an angle calculating unit for calculating the rotation angle of the first rotation body and the rotation angle of the second rotation body with reference to the first continuous signal for the angle and to the second continuous signal for the angle, that are input thereinto by using the signal input unit;

a number of rotations judging unit for judging the number of rotations regarding the main rotation body with reference to a finite difference between the rotation angle of the first rotation body and the rotation angle of the second rotation body, that are calculated by using the angle calculating unit; and a large angle calculating unit for calculating the absolute rotation angle of the detectable rotation body, with reference to the number of rotations regarding the main rotation body to be judged by using the number of rotations judging unit and to the first continuous signal for the angle or the second continuous signal for the angle to be detected by using the main detecting unit.

3. The rotation angle detector as defined in claim 1, wherein a cycle of an angle section for judgment is defined as Sc, an absolute value of a finite difference between the cycle of the angle section for judgment Sc and the cycle of the rotation angle Tm is defined as cyclic difference $\Delta S$, and a value of relations K between the cycle of the rotation angle Tc and the cycle of the rotation angle Tm is assumed to be as K=Tc/Tm, and then the value of relations K is satisfied with which is not an integer, further, the cycle of the rotation angle Tc, the cycle of the angle section for judgment Sc and the cyclic difference $\Delta S$ satisfy the following expression of relations as $$Sc=Tc/i=\Delta S \cdot j,$$

(the i and the j are positive integers respectively, and the symbol "·" means a multiplication operator).

4. The rotation angle detector as defined in claim 2, wherein a cycle of an angle section for judgment is defined as Sc, an absolute value of a finite difference between the cycle of the angle section for judgment Sc and the cycle of the rotation angle Tm is defined as cyclic difference $\Delta S$, and a value of relations K between the cycle of the rotation angle Tc and the cycle of the rotation angle Tm is assumed to be as K=Tc/Tm, and then the value of relations K is satisfied with which is not an integer, further, the cycle of the rotation angle Tc, the cycle of the angle section for judgment Sc and the cyclic difference $\Delta S$ satisfy the following expression of relations as $$Sc=Tc/i=\Delta S \cdot j,$$

(the i and the j are positive integers respectively, and the symbol "·" means a multiplication operator).

5. The rotation angle detector as defined in claim 3, wherein the value of relations K is not smaller than 1.8 but not larger than 2.25 in a case where the i=2.

6. The rotation angle detector as defined in claim 3, wherein the value of relations K is not smaller than 2.8 but not larger than 3.2 in a case where the i=3.

7. The rotation angle detector as defined in claim 4, wherein the value of relations K is not smaller than 1.8 but not larger than 2.25 in a case where the i=2.

8. The rotation angle detector as defined in claim 4, wherein the value of relations K is not smaller than 2.8 but not larger than 3.2 in a case where the i=3.

9. A process for detecting a rotation angle, with comprising a first rotation body to be rotated with corresponding to a rotation of a detectable rotation body to be rotated a multiple number thereof and a second rotation body to be rotated due to the first rotation body or the detectable rotation body, and for detecting an absolute rotation angle of the detectable rotation body, comprising the steps of:

(a) detecting a rotation angle of the first rotation body to be rotated as a cycle of the rotation angle Tc, as a first detection step;

(b) detecting a rotation angle of the second rotation body to be rotated as a cycle of the rotation angle Tm with corresponding to the rotation of the detectable rotation body, that is different from the cycle of the rotation angle Tc regarding the first rotation body, as a second detection step; and (c) detecting the absolute rotation angle of the detectable rotation body with reference to a first continuous signal for the angle to be detected at the first detection step (a) and to a second continuous signal for the angle to be detected at the second detection step (b), as a rotation angle detection step, wherein the individual rotation bodies is rotated with corresponding to the rotation of the detectable rotation body, and a rotation angle of the detectable rotation body to be rotated in a period of the individual rotation bodies to be rotated as 360 degrees is defined as the individual cycles of the rotation angle respectively; and in a case where either one of the first rotation body or the second rotation body is assumed to be as a main rotation body, the other one thereof is assumed to be as a substitutive rotation body, the step for detecting the rotation angle of the main rotation body is defined as a main detection step and the step for detecting the rotation angle of the substitutive rotation body is defined as a substitutive detection step, at the rotation angle detection step (c) a number of rotations regarding the main rotation body is detected with reference to a difference of phases $\Delta T$ between the first continuous signal for the angle and the second continuous signal for the angle, and the absolute rotation angle of the detectable rotation body to be rotated the multiple number thereof is calculated with reference to the individual continuous signals for the angle and the number of rotations to be detected at the main detection step.

10. The process for detecting the rotation angle as defined in claim 9,
wherein the rotation angle detection step (C) comprises the steps of:
(d) inputting the first continuous signal for the angle and the second continuous signal for the angle, as a signal input step;
(e) calculating the rotation angle of the first rotation body and the rotation angle of the second rotation body as an angle calculation step, with reference to the first continuous signal for the angle and to the second continuous signal for the angle, that are input thereinto at the signal input step (d);
(f) judging the number of rotations regarding the main rotation body as a number of rotations judging step, with reference to a finite difference between the rotation angle of the first rotation body and the rotation angle of the second rotation body, that are calculated at the angle calculation step (e); and
(g) calculating the absolute rotation angle of the detectable rotation body as a large angle calculation step, with reference to the number of rotations regarding the main rotation body to be judged at the number of rotations judging step (f) and to the first continuous signal for the angle or the second continuous signal for the angle to be detected at the main detection step.

* * * * *